(No Model.)
J. M. VILLA.
Proportional Dividers.
No. 229,777. Patented July 6, 1880.
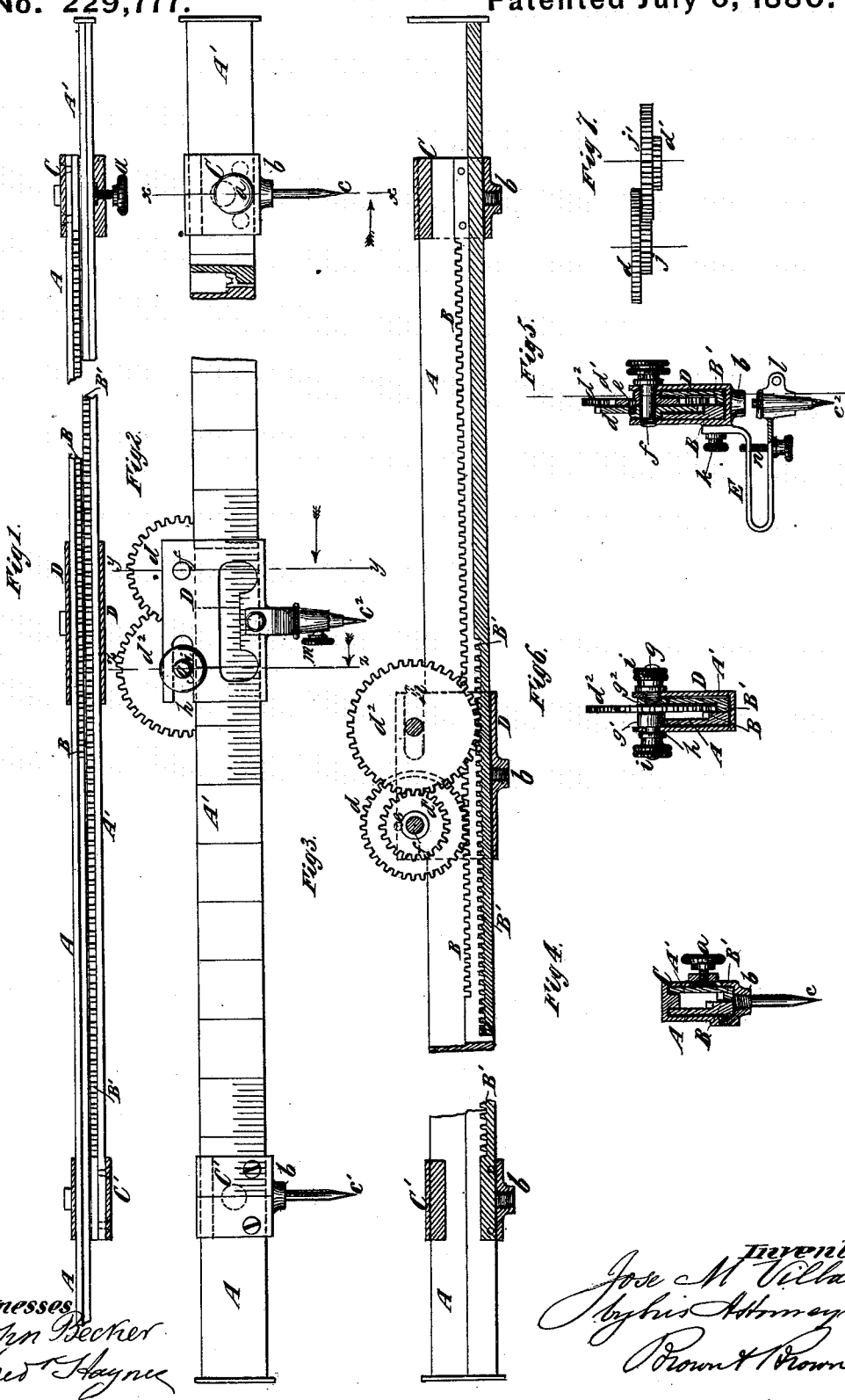
Witnesses
John Becker
Fred't Hayne
Inventor
Jose M Villa
by his Attorneys
Brown & Brown

UNITED STATES PATENT OFFICE.

JOSÉ M. VILLA, OF MEDELLIN, ANTIOQUIA, UNITED STATES OF COLOMBIA.

PROPORTIONAL DIVIDERS.

SPECIFICATION forming part of Letters Patent No. 229,777, dated July 6, 1880.

Application filed May 20, 1880. (No model.)

*To all whom it may concern:*

Be it known that I, JOSÉ M. VILLA, of Medellin, in the State of Antioquia and United States of Colombia, have invented a certain new and Improved Drawing-Instrument, of which the following is a specification.

My invention consists in an instrument applicable as a pantograph, a proportional dividers, or a beam-compass, and which is composed of two rules which are adapted to slide one upon the other, and which are guided by means of trammel-heads attached one to the end of each rule and embracing the two rules, and a center head or carriage fitting loosely upon the rules between the trammel-heads.

The two rules are constructed with or have attached to them longitudinal racks, and the center head or carriage has mounted in or upon it two wheels upon a common axis, one of which connects directly with one rack, while the other connects with the other rack by means of a transmitting-wheel. Each of the three heads carries a point, one of which may consist of a pencil, while the other two are respectively a center and a tracing point, and the wheels upon the center head or carriage engaging with the racks upon the rules hold the center point at the same proportional distance from either of the end points whether the instrument is extended or contracted. The wheel which engages with the transmitting-wheel, as heretofore stated, is locked fast to the first wheel, but may be removed and another wheel substituted having a different number of teeth relatively to the first-named wheel, and by thus changing the wheels the scale of reduction or enlargement will be varied as may be desired.

My invention also consists in details of construction and combinations of parts, to be hereinafter described.

In the accompanying drawings, Figure 1 represents a plan of the two rules and a horizontal section of the trammel-heads and center head or carriage. Fig. 2 represents a side view, partly in section. Fig. 3 represents a longitudinal section through the instrument. Fig. 4 represents a transverse section on the line $x\,x$, Fig. 2. Fig. 5 represents a similar section on the line $y\,y$, Fig. 2. Fig. 6 represents a similar section on the line $z\,z$, Fig. 2, and Fig. 7 represents a diagram view of a modification of the gear-wheels employed.

Similar letters of reference represent corresponding parts in all the figures.

A A' designate two rules, preferably made of metal, and of equal width and thickness. They are intended to slide face to face upon proper bearings, and are preferably provided, respectively, with scales of inches and centimeters on their outer faces.

B B' designate two racks attached to or formed upon the inner adjacent faces of the rules, and preferably near their lower edges.

C C' designate two trammel-heads attached to the ends of the two rules, respectively, and embracing both, each head being provided with a suitable slide-bearing for the rule to which it is not attached, so that the two heads may approach and recede from each other as the two rules slide in parallel lines. One of the said heads is also provided with a set-screw, $a$, for clamping the two rules together and preventing sliding when required.

D designates a central head or carriage, open at the top and having flanges projecting above the rules. This carriage embraces the rules, and is provided with suitable bearings to slide on them between the trammel-heads. It is adapted to support a system of wheels so connected with each other and with the racks that when turned, supposing the carriage to be fixed meanwhile, they impart sliding motion to the rules in opposite directions and with proportionate velocities.

The trammel-heads C C' and carriage D are furnished with suitable provision, such as sockets $b$, upon their under sides for receiving pen, pencil, or needle points, so that the three points $c\ c'\ c^2$ shall be in a straight line parallel to the rules. They are also provided with reading-points, corresponding to the scales above referred to, to ascertain the distance of the points $c\ c'\ c^2$, and also with vernier-scales, if more accuracy is desirable, when the instrument is used as a proportional dividers or a beam-compass. These scales, reading-points, and vernier-scales are not necessary when a scale of equal parts is accessible, in which case the three points of the instrument are applied to the scale to ascertain their distances from each other.

$d\ d'$ designate two concentric wheels connected by means of a pin, $e$, fixed in the first, entering a hole in the other, or other suitable coupling device. This enables the wheel $d'$ to be easily replaced by one of different diameter when desirable.

The carriage D, in addition to the wheels $d\ d'$, supports a third wheel, $d^2$. The first two wheels, $d\ d'$, rotate together loosely upon a pin or shaft, $f$, which is represented as provided with a milled head, and passes through one flange of the carriage above the rules and screws into the other flange, thus preventing any separation of the flanges.

The wheel $d^2$ turns loosely upon another pin, $g$, between two shoulders, one of which, $g'$, is fast to the pin, while the other, $g^2$, is a nut. The ends of this pin pass through slots $h$ in the flanges of the carriage, and are clamped in any position by nuts $i$ upon each end of said pin.

The wheel $d$ connects directly with the rack B, while the wheel $d'$ connects with the rack B' by means of the transmitting-wheel $d^2$.

To adjust the instrument, disengage the wheel $d^2$ from the wheel $d'$, then slide the rules and carriage to bring the extreme points $c\ c'$ to such distances from the center point, $c^2$, as are represented by the number of teeth in the wheels $d\ d'$, which transmit motion to the said points through the racks B B', the rules A A', and the trammel-heads C C', respectively, and rigidly connected with the points $c c'$.

The wheels and the racks should, of course, all be of uniform pitch. Suppose, for instance, that the wheels $d\ d'$ have thirty and twenty-two teeth, respectively, then the points $c$ and $c'$ shall be placed at thirty and twenty-two inches, or parts of an inch, respectively, from the center point, $c^2$. The wheel $d^2$ is then brought into gear with the wheel $d'$ and its supporting pin or shaft clamped fast, in which condition the instrument is ready for use, and when contracted or extended the said distances, respectively, remain proportional to each other.

If we take point $c^2$ as the center of similitude, the scales of reduction and enlargement are respectively $\frac{22}{30}$ and $\frac{30}{22}$, when the tracing and pencil points are $c$ and $c'$, or reversely. If we take the point $c$ as a center, the scales are $\frac{30}{52}$ and $\frac{52}{30}$, according as the point $c'$ or $c^2$ is the pencil. If the point $c'$ is the center, the scales will be $\frac{22}{52}$ and $\frac{52}{22}$, according to the position of pencil and tracing points.

It is evident that for every wheel $d'$ three different scales of reduction, corresponding to three scales of enlargement, are obtained. It is only in case of the wheel $d'$ having an equal diameter with the wheel $d$ that no more than one scale of reduction ($\frac{1}{2}$) corresponding to another (2) of enlargement, is obtained. The instrument so adjusted for a pantograph is also in condition to be used as a proportional dividers.

In case a very long range of reduction or enlargement is desired to avoid using very small wheels $d'$, it would be preferable to substitute the system of wheels shown in Fig. 7, in which the wheels $d\ j$ turn on a common axis and impart motion to the wheels $j'\ d'$, which turn on another axis. In this case the wheels $d$ and $d'$ are permanent sizes and connect directly with the racks. The wheel $j$ may also be permanent, while $j'$ is to be changed, $j$ and $j'$ being susceptible of being changed in position, thus causing $j'$ to drive $j$.

It is evident that for every wheel $j'$ six scales of reduction or six of enlargement may be obtained, instead of three and three, as in the former arrangement.

If the wheels $d\ j\ d'\ j'$ are respectively two inches, one inch, two inches, and one inch in diameter, they will give the same scales of reduction and enlargement as in the former case with the wheels $d\ d'$—two inches and one-half an inch, respectively—and will, of course run much easier.

When the instrument is used as a pantograph the pencil-point should be pressed down by a yielding pressure; and E designates a spring pencil-holder, which may be secured to the side of the carriage D or either of the trammel-heads by means of a screw, $k$, and which is provided with a split-ring-shaped socket, $l$, adapted to be contracted by a screw, $m$, to clamp and hold a pencil or a device containing a pencil-lead, and with a screw, $n$, for adjusting the tension of the spring.

When it is required to use the instrument as a beam-compass the central head or carriage does not operate. The trammel-heads being adjusted to the required distance apart, the two rules are clamped in that position by the set-screw $a$ in one of the trammel-heads. It is obvious that the portions of the rules projecting beyond the trammel-heads balance each other, whether the instrument is used as a pantograph, a beam-compass, or a proportional dividers.

What I claim as my invention, and desire to secure by Letters Patent, is—

1. The combination of two rules placed side by side, trammel-heads attached thereto and holding them parallel to each other, yet permitting their longitudinal movement, a central head or carriage fitting loosely upon said rules, racks attached to said rules, and gear-wheels supported in bearings in said central head or carriage and engaging with said racks and with each other, for imparting motion from one rack to the other, whereby the central head or carriage is always maintained at a uniform relative or proportional distance from the trammel-heads, substantially as and for the purpose specified.

2. The combination of two rules placed side by side, trammel-heads attached thereto, holding them in face-to-face contact, yet permitting of their longitudinal movement, a central head or carriage fitting loosely upon said rules, racks attached to said rules, two wheels supported in bearings in said central head or carriage and engaging one with each rack, and a third wheel secured to one of said two wheels, so as to rotate therewith and engaging with the other of said wheels, substantially as and for the purpose specified.

3. The combination of the rules A A', provided with racks B B', the trammel-heads C C', the carriage D, the wheels $d\ d'\ d$, and the thumb-screw $a$, for clamping said rules together, substantially as specified.

4. The combination, with the rules A A', the trammel-heads C C', and carriage D, each of which is constructed with provision for receiving and securing a point, of the spring pencil-holder E, adapted to be secured to either of said trammel-heads or to the carriage, substantially as specified.

JOSÉ M. VILLA.

Witnesses:
   FREDK. HAYNES,
   CHANDLER HALL.